(12) United States Patent
Macouzet Díaz Leal et al.

(10) Patent No.: US 11,724,953 B2
(45) Date of Patent: Aug. 15, 2023

(54) SYSTEM AND METHOD FOR FIRE-POLISHING GLASS CONTAINERS

(71) Applicant: Vitro, S.A.B. de C.V., San Pedro Garza Garcia (MX)

(72) Inventors: Adrián Enrique Macouzet Díaz Leal, Tlalnepantla (MX); Alejandro Becker Del Río, Atizapan de Zaragoza (MX); Enrique Baquerie González, Metepec Unidad la Antigua (MX)

(73) Assignee: Vitro, S.A.B. de C.V., Nuevo León (MX)

(*) Notice: Subject to any disclaimer, the term of this patent is extended or adjusted under 35 U.S.C. 154(b) by 81 days.

(21) Appl. No.: 17/061,801

(22) Filed: Oct. 2, 2020

(65) Prior Publication Data

US 2021/0087098 A1 Mar. 25, 2021

Related U.S. Application Data

(62) Division of application No. 16/091,745, filed as application No. PCT/MX2016/000033 on Apr. 8, 2016, now Pat. No. 10,851,011.

(51) Int. Cl.
C03B 29/06 (2006.01)
C03B 35/06 (2006.01)
C03B 35/10 (2006.01)

(52) U.S. Cl.
CPC ............ *C03B 29/06* (2013.01); *C03B 35/062* (2013.01); *C03B 35/10* (2013.01); *B65G 2201/0235* (2013.01)

(58) Field of Classification Search
None
See application file for complete search history.

(56) References Cited

U.S. PATENT DOCUMENTS 2,209,252 A    7/1940  Stewart et al.
2,248,430 A    7/1941  Knight
              (Continued)

FOREIGN PATENT DOCUMENTS

CN    102225840 A    10/2011
DE    1017058 A1     11/1991
              (Continued)

OTHER PUBLICATIONS

CN 102225840 machine translation, Xia X, Flame polishing Machine for containers, Oct. 2011 (Year: 2011).*

*Primary Examiner* — Queenie S Dehghan
(74) *Attorney, Agent, or Firm* — The Webb Law Firm

(57) ABSTRACT

A system and method for fire-polishing glass containers includes at least one fixed structure positioned on each side of a conveyor belt, in the forward movement direction of the glass containers; a structure that can move via each of the fixed structures, which moves with a forward movement in relation to the forward movement line of the conveyor belt, and with a backward movement in relation to the forward movement of the conveyor belt; a series of burners coupled to each of the moveable structures; sensors positioned on one side of the conveyor belt to determine the speed of the carrier belt and the distance or separation between containers; and a control device connected to the sensors and moveable structure, for adjusting and synchronizing the speed and distance of the containers.

11 Claims, 5 Drawing Sheets

(56) References Cited

U.S. PATENT DOCUMENTS

| | | |
|---|---|---|
| 4,265,651 A | 5/1981 | Morel |
| 5,716,425 A | 2/1998 | Wolfe et al. |
| 2009/0217707 A1 | 9/2009 | Lesche |

FOREIGN PATENT DOCUMENTS

| | | | |
|---|---|---|---|
| DE | 19839563 A1 | 3/2000 | |
| EP | 949211 A2 * | 10/1999 | ............. C03B 35/04 |
| JP | 5888133 A | 5/1983 | |

* cited by examiner

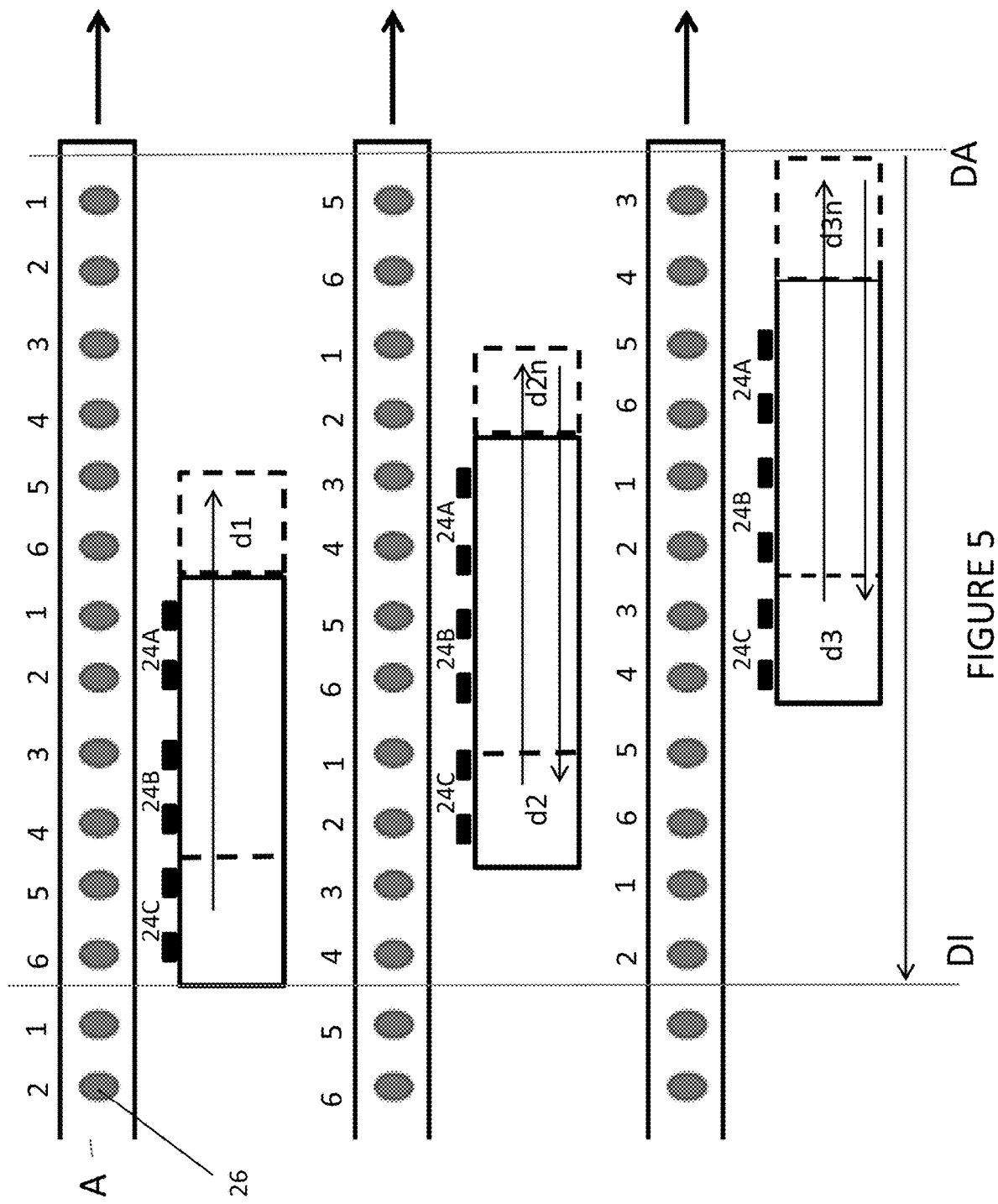

SYSTEM AND METHOD FOR FIRE-POLISHING GLASS CONTAINERS

CROSS-REFERENCE TO RELATED APPLICATIONS

This application is a divisional application of U.S. application Ser. No. 16/091,745, filed Apr. 8, 2016, which is the United States national phase of International Application No. PCT/MX2016/000033 filed Apr. 8, 2016, the disclosure of which is hereby incorporated in its entirety by reference.

FIELD OF THE INVENTION

The present invention refers to the production of glass containers and more specifically to a system and method for fire polishing glass containers.

BACKGROUND OF THE INVENTION

Glassware such as glass bottles are usually produced in glassware forming machines which can include multiple similar individual forming sections by the blow-blow process, while wide-mouth jars, glasses and other glass products are produced in forming machines known as Series "E" and "F" by the press-blow process, the so-called "hot mold".

During the containers manufacturing process by means of the blow-blow or press-blow process, the glass in the form of gob is introduced into a parison or preformed mold in the parison forming station, where, depending on the process, the gob settles by means of a blowing or vacuum process to the lower part of the parison mold to form the crown of the container. Then, once the crown of the container is formed, a counter-blow is made to form the container parison or preform. Subsequently, the container preform is transferred by an invert mechanism with a 180-degree movement of the parison mold to a final blow mold of the forming station or final blow mold, where final shape is given to the container. Finally, the newly formed container is conveyed by a take-out mechanism to a dead plate at the front of the machine and then transferred by means of a conveyor belt to a tempering furnace where the container is decorated or packed.

However, with regard to containers for the perfumery, cosmetics and pharmaceuticals industry, the objective of which are intended to maintain and preserve the properties of the products they contain, it is required that containers be additionally treated with some method of surface polishing. The objective of these techniques is to remove some manufacturing defects on the surface of the container such as roughness, tiny cracks, edges affecting the appearance of the containers such as gloss, transparency, etc.

There are currently some methods for polishing and brightening glassware, such as immersing the item in a hydrofluoric and sulphuric acid mixture bath and then continuing with a washing step. However, the process is expensive and has a considerable environmental impact.

Another polishing and brightening technique is the fire polishing method, in which the surface of the glassware is exposed to a flame or heat. Due to the melting of the glass surface, the surface tension smooths the surface outwards, producing a smooth, shiny surface.

For example, U.S. Pat. No. 2,209,252 refers to an apparatus for glazing glassware to produce a high polish on both the exterior and the interior of a glass article. The glass polishing is carried out in two steps, first the exterior of the article is cooled while interior thereof is polished. After, cooling fluid is directed into the interior of the articles and an external polishing unit polishes the exterior of the article. This is to prevent deformation of the product during the polishing step.

The machine preferably uses an endless chain or conveyor belt that moves in a horizontal plane. This chain or conveyor carries a number of vertical spacing articles-supporting spindles. The chain is adapted to carry the articles beyond the different units. The chain is continuously moved and several operations are carried out by the different units during operation of the chain. The machine to carry out this process includes an endless chain or conveyor belt that moves in a horizontal plane. This chain or conveyor carries a number of item spacers. The chain is adapted to carry the articles through different units. The chain is continuously moved and operations are carried out by the different units during operation of the chain.

Another type of machine for fire finishing glassware is described in the U.S. Pat. No. 4,265,651 from Jean Morel, which has a frame, a vertical rotary assembly mounted on the frame, drive means for ensuring the rotation of the vertical assembly which further comprises means for supporting article supporting cups intended to move over a circular path and burner holder means provided to follow the cups in their movement, wherein the supply of the burners is subjected to the action of adjustable means for opening and closing the flows of fuel so that the burners are adjusted once and for all in optimum manner and it is possible to vary the portion of path of the cups where fire-finishing takes place. The invention is more particularly applied to the manufacture of glass articles whose shape may or may not be of revolution.

Even though some examples of a fire polishing machine for articles have been described, this type of process is currently carried out after the articles have been formed in the forming machine and during their transfer to the tempering furnace. This process is carried out by placing a first series of fixed burners on the first side of the line in parallel with the conveyor belt feed, and a second series of fixed burners are placed on the opposite side of the line, also on the conveyor belt feed line, in an out of phase position with respect to the first series of burners, so the glassware, when moved by the conveyor belt, is exposed to a first flame or heat flow on the first side of the container and then exposed to fire on the second side of the container.

In this case, burners are placed at different heights, to project the heat or flame flow to different areas of the glassware body, while moving on the conveyor belt. The exposure time of the glassware to fire is between 10 to 30 seconds, during that time the upper layers of the glass container are melted with no distortion.

However, during this kind of process, one of the problems is that during the passage of the glassware through the line of burners (which are fixed), they only polish their predetermined area for a few fractions of a second, according to the forward speed of the conveyor belt.

Even though this process achieves a good quality of products, this type of arrangement requires a greater number of burners per area, exposing the product to a high intensity heat flow and short duration, which causes an overheating in the structure of the container, and may induce some deformations in the surface of the container.

Therefore, this invention refers to a system and method for fire polishing glass containers, the objective of which is to improve the appearance of the container subjected to polishing by means of surface burners with natural gas and oxygen combination, using energy efficiently in specific areas of the container.

SUMMARY OF THE INVENTION

The system and method for fire-polishing glass containers includes: at least one fixed structure placed on each side of the conveyor belt in a forward direction of the glass containers; a movable structure for each of the fixed structures, which moves with a forward movement with respect to the conveyor belt's forward line and with a backward movement with respect to the forward line of the conveyor belt; each set of fixed structure and movable structure, are placed in phase shifting in relation to each other; a plurality of burners coupled to each of the movable structures, which travel together with each of the movable structures at the same forward speed of the conveyor belt provide a continuous flame or heat flow to each side of the container; sensing means in proximity to the conveyor belt to determine the conveyor belt speed and distance between containers; and control means connected to the sensor means and movable structure, to adjust and synchronize the speed and distance of the containers, to achieve better positioning of the burners and to absorb any offset of the conveyor belt.

The system also includes flame detection sensors, which allow the equipment to switch on/off automatically in the following cases:
  Start-up of the equipment.
  Emergency shutdown.
  No product on the conveyor belt.
  Counting system for energy consumption.
  This system allows to know the natural gas and oxygen consumption.

OBJECTIVES OF THE INVENTION

Therefore, a first objective of the present invention is to provide a system and method for fire polishing glass containers, reducing the number of burners.

An additional objective of the present invention is to provide a system and method for fire polishing glass containers, which allows by means of surface burners, natural gas and oxygen to improve the appearance of the container using the energy efficiently and the surface of each container continuously.

Another objective of the present invention is to provide a system and method for fire polishing glass containers, which allows the burners to travel a certain distance and in the same direction at the operating speed of the conveyor belt to carry out the polishing operation of the containers.

An additional objective of the present invention is to provide a system and method for fire polishing glass containers, which allows adjusting any gap of the conveyor belt with respect to the positioning of each burner.

An additional objective of the present invention is to provide a system and method for fire polishing glass containers, which reduces the natural gas and oxygen consumption.

An additional objective of the present invention is to provide a system and method for fire polishing glass containers, where the containers are exposed at all times to a fixed area along the length of the container tracking, which allows the container temperature to be increased and achieve a better polishing quality.

These and other objectives and advantages of the present invention will be evident to experts in the field of the following detailed description.

DETAILED DESCRIPTION OF THE DRAWINGS

Figure 1:
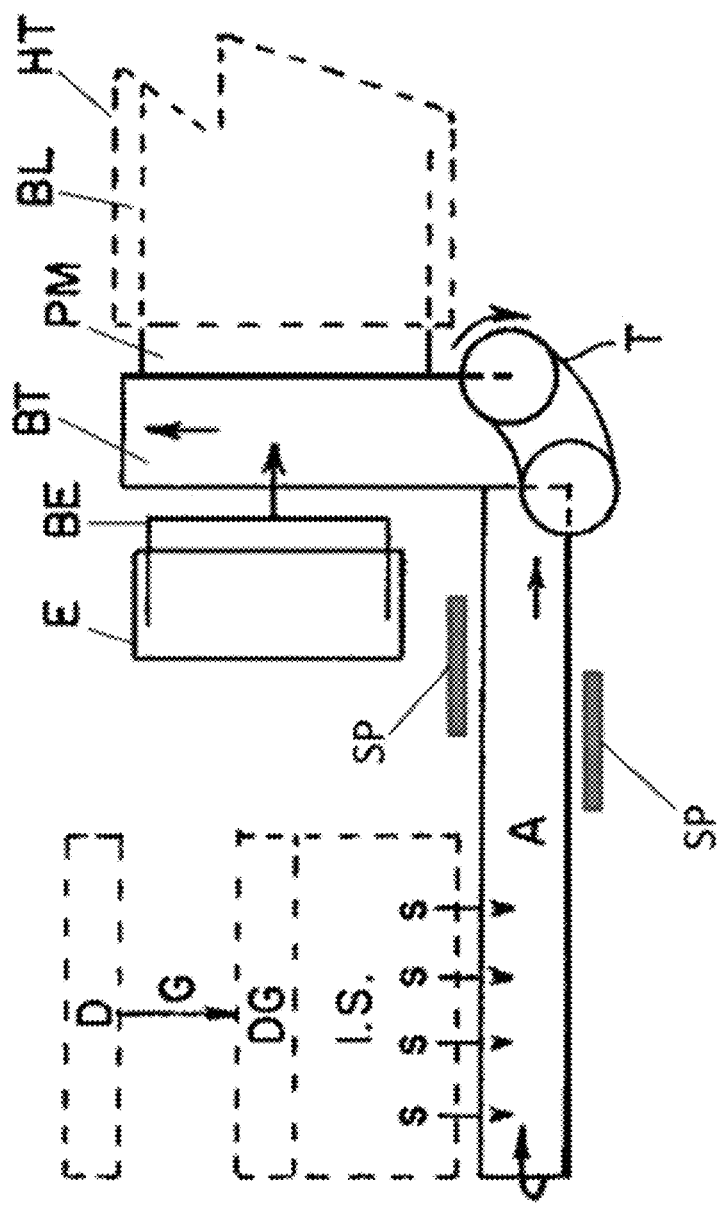
FIG. 1 is a schematic diagram of the production and handling process for glass containers showing the location of the system of the present invention.

Referring to FIG. 1, in the glassware forming process such as for vessels or containers, the molten glass is fed from a feeder D in a gob form G, which are distributed by a distributor DG to the individual forming sections of an I.S. machine. The products formed by each of the still hot sections S are first laid on a dead plate (not shown) in the respective section. Then the containers are pushed from there onto a conveyor belt (A) that moves the containers of all sections to a transfer mechanism T at the end of the section, which controls the flow of the products by separating them evenly and changing the flow direction by 90° and placing them one by one on a cross conveyor BT in an evenly spaced row. Once a complete row of formed containers has been formed, an pusher E simultaneously transfers all containers in the row of the cross conveyor belt BT, through transition dead plates PM of a linear conveyor belt BL into an annealing furnace HT.

The location of the fire polishing system SP for glass containers in accordance with this invention is schematically shown in FIG. 1.

Figure 2:
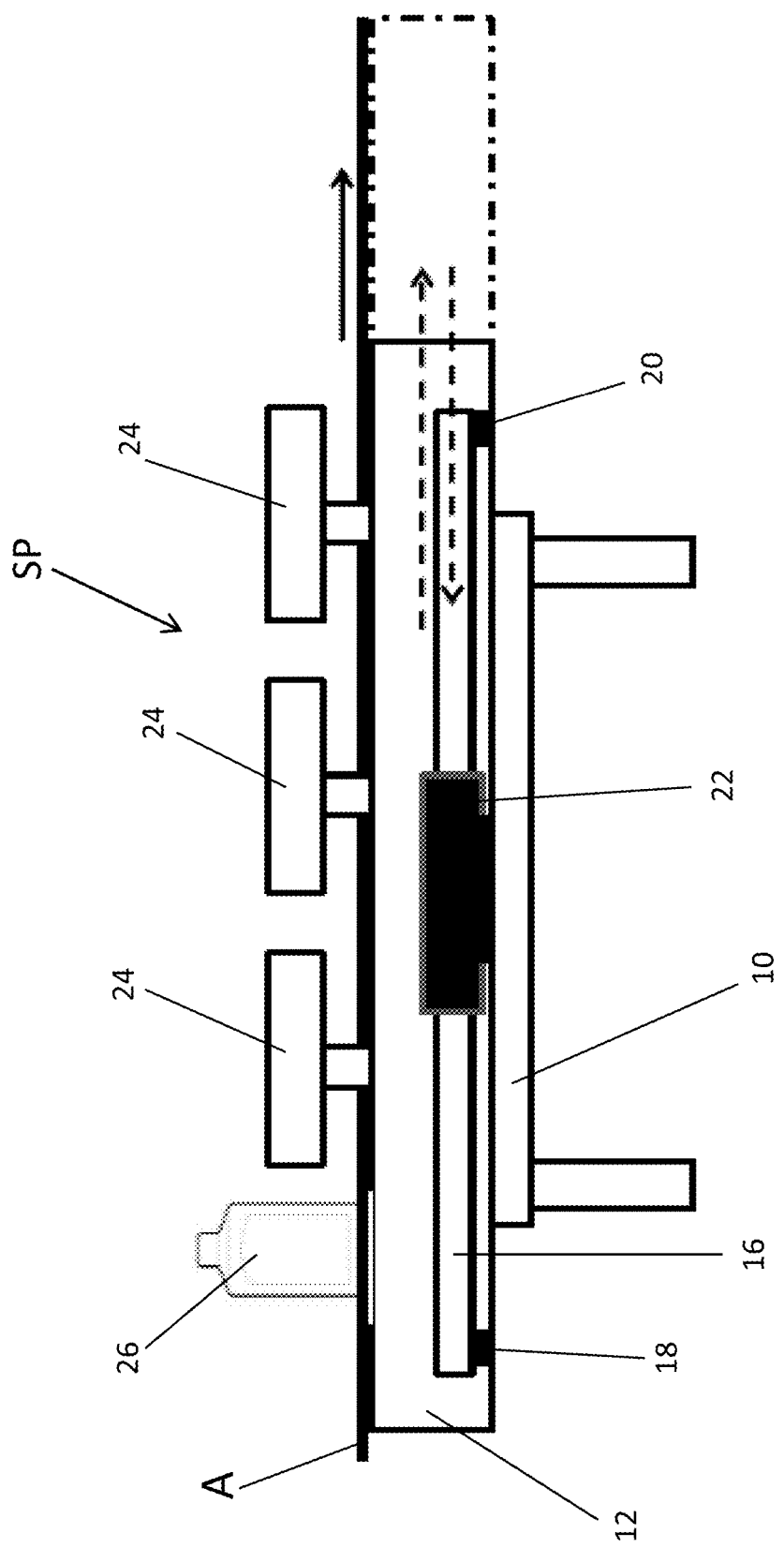
FIG. 2 is a schematic diagram showing a side view of the system for fire polishing glass containers of the present invention.
Figure 3:
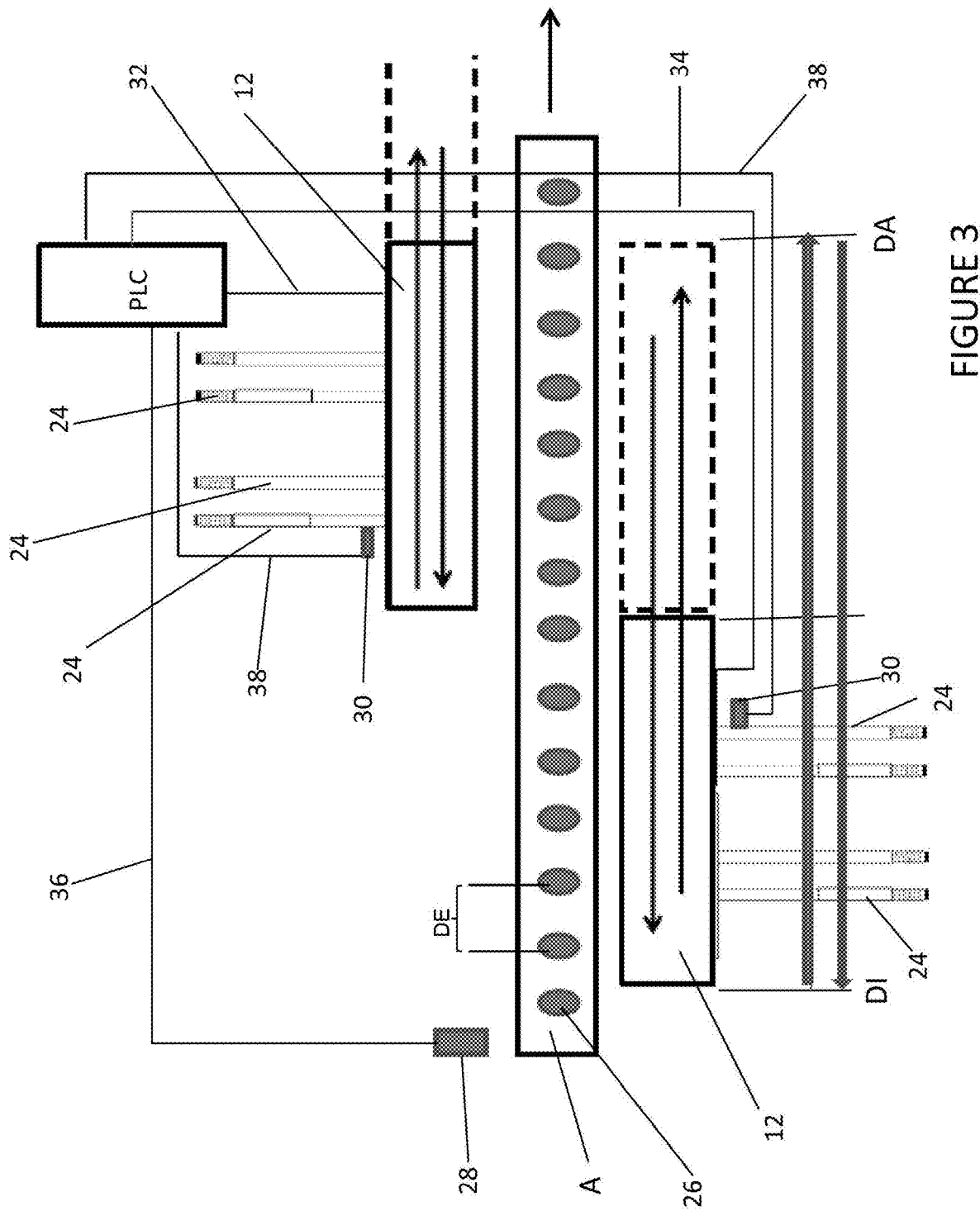
FIG. 3 is a schematic diagram, in a plan view, of the fire polishing system for glass containers of the present invention.

The following will describe in detail each part and operation of the system of this invention according to FIGS. 2 and 3, which includes: a fixed support structure 10 placed on each side of the conveyor belt (A), in the direction of the glass containers' advance. A movable structure 12 is coupled to slide on the fixed support structure 10, which moves with a forward movement at the same forward speed as the conveyor belt (A) and with a backward movement in the opposite direction to the feed rate of the conveyor belt (A). The movable structure 12 includes a lengthwise bar 16 coupled to the movable structure 12, which is fixed by means of cross support bars 18, 20, at each of its ends. The lengthwise bar 16 is coupled to a magnetic linear motor 22, which produces a straight line movement, on which the lengthwise bar 16 and consequently the movable structure 12 slide, with a forward and backward movement. At least one series of burners 24 are coupled on the movable frame 12, which are arranged toward the front of the conveyor belt (A) to provide a flame or heat flow to each side of containers 26. Burners 24 are mounted on burner holders (not shown) on the movable support structure 12, which allow the height or angle of flame projection to be adjusted according to the height of items 26.

As shown in FIG. 3, the polishing system SP of this invention is placed on both sides of the conveyor belt (A), which are placed in a counter-position to each other, which are separated or offset by a certain distance. According to the layout shown, both movable structures 12 move simultaneously, with a forward movement, up to a predetermined feed distance DA in the direction of continuous movement of the conveyor belt (A) providing during its advance run, a flame on both sections of the containers 26. For example, the movable structure 12 can have a maximum run of 200 cm, but this may vary depending on the shape and size of the articles.

Once the movable structure 12 and burners 24 have completed the advance run, the structure returns to its starting position (DI distance) to perform a new polishing step for containers 26 that are continuously moving on the conveyor belt (A). The polishing speed can be adjusted up to 2 m/s with a maximum reverse speed of 2 m/s.

Since burners 24 travel at the same speed as the conveyor belt (A), containers 26 require less exposure to fire, therefore, reduce the number of burners 24 allowing a considerable saving of gas and oxygen. According to the mode shown and based on the previous art, it was possible to reduce the number of structures (SP) from 3 to 2, i.e. from 18 to 12 burners.

Sensors 28 are placed on one side of the conveyor belt (A) to determine the conveyor belt (A) speed and the distance or spacing (DE) between containers 26; and, flame presence sensors 30, located in proximity to burners 24, allow the automatic on/off of the equipment in the following cases: equipment start-up, emergency shutdown and absence of containers on the conveyor belt (A).

A programmable logic controller (PLC), connected via lines 32, 34, to the magnetic linear motors 22 to move each movable structure 12. This controller (PLC) is also connected to sensors 28 through line 36 and to flame presence sensors 30 through line 38, to calculate and synchronize the speed and space (DE) of containers 26, in real time, to achieve a better positioning of burners 24 and to absorb any offset of the conveyor belt (A).

Figure 4:
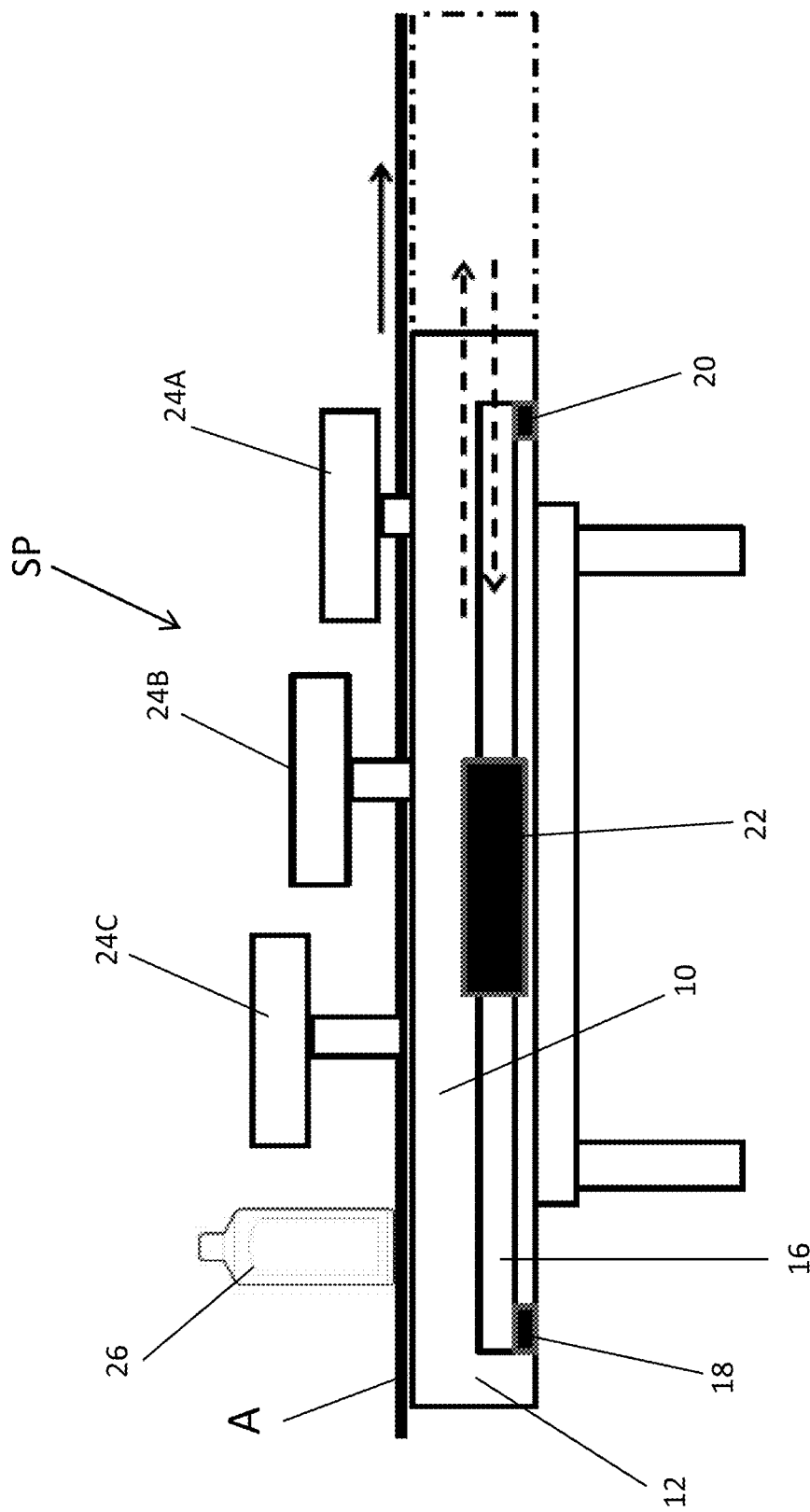
FIG. 4 is a schematic diagram showing the side part of the system for fire polishing glass containers of the present invention and, also showing the burners at different heights, in accordance with a second embodiment of the present invention; and, FIG. 5 shows a schematic diagram (according to FIG. 4), showing in the form of horizontal bars, the different forward and backward movements of the fire polishing system for glass containers, according to a second embodiment of the present invention.

In a second embodiment of this invention, burners 24 are placed at different heights, to project the flow of heat or flame towards different zones of the body of the glass containers 26, while they continuously advance on the conveyor belt (A). However, the advantage over the previous art is that the movable structure 12 is backed up several times before reaching its predetermined advance stroke (DA) (see FIGS. 4 and 5) i.e. in a container line 26 on the conveyor belt (A), burners 24 and movable structure 12 advance a certain distance (d1), for example, in a line of six containers, the first burners 24A project the heat flow to the bottom of the containers (1 and 2), the second burners 24B project the heat flow to the middle of the containers (3 and 4) and the third burners 24C project the heat flow to the top of the containers (5 and 6). Once the different areas of the containers 26 have been exposed to the heat flow (e.g. ten to fifteen seconds), the movable structure 12 moves back a second distance (d2), and now the first 24A burners project the heat flow to the middle part of the containers (3 and 4), the second 24B burners project the heat flow to the upper part of the containers (5 and 6) and move forward again, in that position, at the same speed of the conveyor belt (A) at a distance (d2n) projecting the heat flow to each container 26 areas. Since this is a continuous process, the third burners 24C start projecting the heat flow to the next row of containers 26, i.e. the bottom of the containers (1 and 2).

Once the different areas of containers 26 have been exposed to the heat flow for a period of ten or fifteen seconds, the movable structure 12 moves back a third distance (d3) and again moves forward with the same speed of the conveyor belt (A) a new distance (d3n). As a result, the first burners 24A now project the heat flow to the top of the containers (5 and 6); the second burners 24B project the heat flow to the middle part of the containers (3 and 4) and the third burners 24C project the heat flow to the lower part of the containers (1 and 2). The movable structure 12 can have a maximum run of 200 cm, but this may vary depending on the shape and size of the items, so the movable structure 12 and burners 26 can back up and move forward three or four times, projecting the heat flow to all of the container areas before reaching its forward distance (DA). Considering that the container rows 26 have a continuous movement, the movable structure 12 and burners 26 travel a maximum advance, which would be represented by $DA=d1+d2n+d3n$, and once reached, move back to the starting distance D1.

In a third embodiment of this invention and on the basis of FIG. 2, all burners 24 may be automatically adjusted during the movable structure 12 movement, i.e. all burners can direct a heat flow to all containers 26 from the beginning, in a first area of the container (e.g. the bottom) in a first time period t1 and distance d1. Then, as containers 26 move forward on the conveyor belt (A), burners 24 can be adjusted towards a second area (e.g. the middle part of containers 26) in a second time period t2 and distance d2n; and finally, adjust burners 24 towards a third area (e.g. the top of containers 26) in a third time period t3 and distance d3n, until they reach their displacement or maximum distance (DA) and start their rewind step. In this case, burners 24 travel all the time at the same speed of the conveyor belt (A) and its adjustment to each of the different areas of containers 26 is set by the programmable logic controller (PLC).

From the above, the method for fire polishing glass containers comprises the steps of:

moving continuously forward a row of freshly formed glass containers on a conveyor belt;

providing a series of burners on at least one side of the conveyor belt;

exposing the containers to a burner flame, directing the flame continuously to the surface of each container up to a first predetermined advance distance DA for polishing the containers, said burners travelling at the same forward speed as the conveyor belt (A);

moving the burners back to a starting distance D1, once the polishing step of the containers has been carried out; and, adjusting the conveyor belt speed, in real time, to achieve a better positioning of the burners on containers 26 and to absorb any offset of the conveyor belt (A).

The method of this invention can include the step of:

sensing the conveyor belt (A) speed and/or spacing (DE) between each container (26) to adjust the burner tracking speed during polishing.

The method of this invention further can include the step of: projecting each burner flame according to the shape of the container surface (26).

The method of this invention further can include the steps of: advancing the movable structure 12 and burners 24A, 24B, 24C up to a distance (d1) to project the heat flow in a first predefined area of containers 26, which are continuously moving forward on the conveyor belt (A); moving back the movable structure 12 and 24A, 24B, 24C burners one distance (d2) to place them in a second predefined area of containers 26 and, again, moving the movable structure 12 and 24A, 24B, 24C burners forward at the same conveyor belt speed (A) until distance (d2n) is reached; moving back the movable structure 12 and 24A, 24B, 24C burners at a distance (d3) to place these burners in a third predefined area for each container 26 and, move the movable structure 12 and 24A, 24B, 24C burners forward again at the same speed as the conveyor belt (A), projecting the heat flow to said third pre-defined area of each container 26, until distance (d3n) that would be equivalent to the maximum advance distance (DA) of the movable structure 12 is reached;

moving back the movable structure 12 and burners 24A, 24B, 24C to a starting distance, once the fire polishing step of the containers has finished.

The method of this invention in a third embodiment includes the steps of:

continuously moving forward a row of freshly formed glass containers on a conveyor belt;

providing a series of burners on at least one side of the conveyor belt, such burners travel at the same forward speed of the conveyor belt until a predetermined advance distance is reached;

adjusting the burners to direct a heat flow to all containers 26 in a first container area in a first time period t1 and distance d1;

adjusting the burners to a second area of containers 26, to direct heat flow to the selected area in a second time period t2 and distance d2;

adjusting the burners 24 towards a third area of containers 26, to direct a heat flow to a third selected area in a third time period t3 and distance d3, until the predetermined advance distance is reached; and moving the burners back to a starting distance, once the polishing step of the containers has been carried out.

From the foregoing, a system and method for fire polishing glass containers has been described and it will be apparent to industry experts that other possible advances or improvements can be made, which may be considered within the field determined by the following claims.

The invention claimed is:

1. A method for fire polishing glass containers comprising the steps of:

continuously advancing a row of freshly formed glass containers on a continuously moving conveyor belt (A);

providing a series of burners mounted on a movable support structure, said support structure located on a least one side of the conveyor belt;

exposing the series of containers to a burner flame for a first advance distance DA, by moving the support structure from a starting position DI to a predetermined distance to polish the containers, the support structure and the conveyor belt moving at a same forward speed;

upon completion of polishing of the containers, moving the burners support structure back to the starting position DI;

providing one or more sensors to measure a speed of the conveyor belt (A), and spacing (DE) between the containers;

providing a controller; and associating the controller with the movable support structure and with the one or more sensors measuring the speed of the conveyor belt and spacing between the containers to calculate and synchronize the speed of the conveyor belt, in real-time, based on the measured speed of the conveyor belt and spacing between the container to control positioning of the burners with respect to the containers and to absorb any phase shift of the conveyor belt.

2. The method for fire polishing glass containers according to claim 1, wherein the steps of sensing the speed of the conveyor belt and separation between containers enables the controller to adjust a speed of the movable support structure and burners during polishing.

3. The method for fire polishing glass containers in according to claim 1, further comprising the step of aligning each burner flame according to a shape of the containers.

4. The method for fire polishing glass containers according to claim 1, wherein the step of providing the series of burners on a movable support structure comprises:

providing a pair of movable support structures located on opposite sides of the conveyor belt, each of said movable support structures holding a series of burners, said movable support structures being offset and separated a predetermined distance with respect to each other; and, simultaneously moving the pair of support structures located on opposite sides of the conveyor belt with a forward and backward movement according to the advance of the containers on the conveyor belt.

5. The method for fire polishing glass containers according to claim 1, wherein the first advance distance (DA) comprises a first distance (d1), a distance (d2), and a distance (d3), and wherein the method comprises the steps of:

moving the burners forward by the first distance (d1) to project a flow of heat toward a first predefined area of the containers that are continuously moving on the conveyor belt;

moving the burners back the distance (d2) to project the flow of heat toward a second predefined area of the containers and advancing the burners at the same speed as the conveyor belt for a distance (d2n);

moving the burners back the distance (d3) to project the flow of heat to a third predefined area of the containers and advancing the burners at the same speed as the conveyor belt for a distance (d3n); and, moving the burners back to the starting position DI upon completion of the fire polishing step of the containers.

6. The method for fire polishing glass containers according to claim 1, wherein the series of burners comprise a first set of burners, a second set of burners, and a third set of burners, and wherein the method comprises the steps of:

adjusting the first set of the burners to direct a heat flow to a first area of the containers for a first time period t1 and distance d1;

adjusting the second set of burners to direct a heat flow to a second area of the containers for a second time period t2 and distance d2;

adjusting the third set of burners to direct a heat flow to a third area of the containers for a third time period t3 and distance d3 until the movable structure and containers reach the predetermined advancing distance DA; and moving the movable structure back to the starting position DI, upon completion of the polishing step of the containers.

7. The method for fire polishing glass containers according to claim 1, wherein at least movement of the conveyor belt, movement of the support structure, and operation of the burners are controlled by the controller.

8. The method for fire polishing glass containers according to claim 7, wherein the controller is a programmable logic controller.

9. The method for fire polishing glass containers according to claim 7, wherein the burners are automatically adjusted by the controller, to project a heat flow to different areas of the container, as they continuously move forward on the conveyor belt until a predetermined forward distance is reached.

10. The method for fire polishing glass containers according to claim 1, wherein at least some of the burners are located at different heights to project a heat flow or flame in steps to predetermined areas of the container.

11. The method for fire polishing glass containers according to claim 1, wherein flame presence sensors are positioned in proximity to the burners to allow for automatic on/off of the burners in case of equipment start-up, emergency shutdown and absence of containers on the conveyor belt.

\* \* \* \* \*

UNITED STATES PATENT AND TRADEMARK OFFICE
CERTIFICATE OF CORRECTION

PATENT NO. : 11,724,953 B2  
APPLICATION NO. : 17/061801  
DATED : August 15, 2023  
INVENTOR(S) : Adrián Enrique Macouzet Díaz Leal et al.

Page 1 of 1

It is certified that error appears in the above-identified patent and that said Letters Patent is hereby corrected as shown below:

On the Title Page

Column 2, Foreign Patent Documents, Line 2, delete "1017058" and insert -- 4017058 --

In the Claims

Column 7, Line 58, Claim 1, after "the" delete "burners"

Column 8, Line 11, Claim 3, after "containers" delete "in"

Column 8, Line 50, Claim 6, after "of" delete "the"

Signed and Sealed this  
Third Day of October, 2023

Katherine Kelly Vidal  
*Director of the United States Patent and Trademark Office*